(12) United States Patent
Schneider

(10) Patent No.: US 8,112,629 B2
(45) Date of Patent: *Feb. 7, 2012

(54) STATELESS CHALLENGE-RESPONSE PROTOCOL

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 932 days.

This patent is subject to a terminal disclaimer.

(21) Appl. No.: 11/977,867

(22) Filed: Oct. 26, 2007

(65) Prior Publication Data

US 2009/0113559 A1 Apr. 30, 2009

(51) Int. Cl.
*H04L 9/00* (2006.01)

(52) U.S. Cl. ........ 713/170; 713/151; 713/168; 713/181; 726/3

(58) Field of Classification Search .................. None
See application file for complete search history.

(56) References Cited

U.S. PATENT DOCUMENTS

| | | | |
|---|---|---|---|
| 6,377,691 B1 * | 4/2002 | Swift et al. ................ | 380/277 |
| 6,760,763 B2 | 7/2004 | Jennings et al. | |
| 7,398,091 B2 | 7/2008 | Chen | |
| RE40,708 E | 5/2009 | Dondeti et al. | |
| 7,669,235 B2 | 2/2010 | Hunt et al. | |
| 7,694,335 B1 * | 4/2010 | Turner et al. ................ | 726/14 |
| 7,769,177 B2 | 8/2010 | Son et al. | |
| 7,793,112 B2 | 9/2010 | Carpentier et al. | |
| 7,818,401 B2 | 10/2010 | Makofka | |

OTHER PUBLICATIONS

DCE 1.1: Remote Procedure Call, The Open Group, 1997.*
Proudler et al., Security for a Connectionless Peer-to-Peer Link, Hewlett-Packard, 1996.*
Lam et al., Timely Authentication in Distributed Systems, ESORICS '92, 1992.*
Stallings, Cryptography and Network Security—Principles and Practices, 2003, Prentice Hall, $5^{th}$ Edition, pp. 286-289, 384-385.*
Red Hat Office Action for U.S. Appl. No. 12/072,884, mailed Mar. 30, 2011.

* cited by examiner

*Primary Examiner* — Minh Dinh
(74) *Attorney, Agent, or Firm* — Lowenstein Sandler PC

(57) ABSTRACT

A two-party stateless protocol by which a server receives a request from a client, transmits a tamper-resistant challenge to the client, receives a response to the challenge, and validates the response, where each of the challenge and the response contain a copy of the request. If the client responds correctly to the challenge and does not modify the request during the protocol, the server executes the request.

23 Claims, 6 Drawing Sheets

STATELESS CHALLENGE-RESPONSE PROTOCOL

FIELD

The invention relates to computer communication protocols. In particular, the invention relates to stateless challenge-response protocols that provide particularized assurances to the participants in the protocol.

BACKGROUND

Many data processing operations include a communication component, where two (or more) systems interact to exchange data and control information. In some environments, these interactions can be anonymous: neither party knows anything about the other, beyond the other's network address (which is generally necessary for any communication to occur). An example of such anonymous interaction is the retrieval of an ordinary Web page: the client (browser) establishes a data connection to a server and requests a document, and the server returns it. (It is appreciated that the Hypertext Transfer Protocol, "HTTP," includes optional parameters and mechanisms by which a server can demand, and a client can provide, information about its identity.)

A variety of network protocols have been developed to serve in applications where the communicating parties need information from, or assurances about, each other. Some protocols are extremely flexible, providing options for each party to request, supply, or decline arbitrary categories of information, while others define simple, straightforward lock-step interactions that can be implemented even by devices with very little computational capacity. However, applications occasionally arise where existing protocols do not permit the establishment and conduct of communications with a desired combination of features. In these applications, a customized protocol may be useful.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

DETAILED DESCRIPTION

Embodiments of the invention permit two parties (e.g., two computer programs or processes) to establish and carry out a conversation, where a first process requests that a second process perform a service, but the second process desires to verify the identity of the first process before carrying out the request. In addition, the protocol is stateless. I.e., neither party needs to preserve data about the other while it is the other's turn to go ahead with the protocol. The statelessness helps protect the participants from denial-of-service attacks where an attacker starts many protocol interactions, but does not proceed with them, in an attempt to exhaust the attacked system's resources. Some embodiments also guard against other attacks, such as eavesdropping or man-in-the-middle ("MITM") attacks. Embodiments will be described in the context of network communications between two parties over a distributed data network such as the Internet, but the two parties might be located near each other on a local area network ("LAN") or even on the same physical machine, using an intra-machine communication channel such as a Unix-domain socket.

Figure 1:
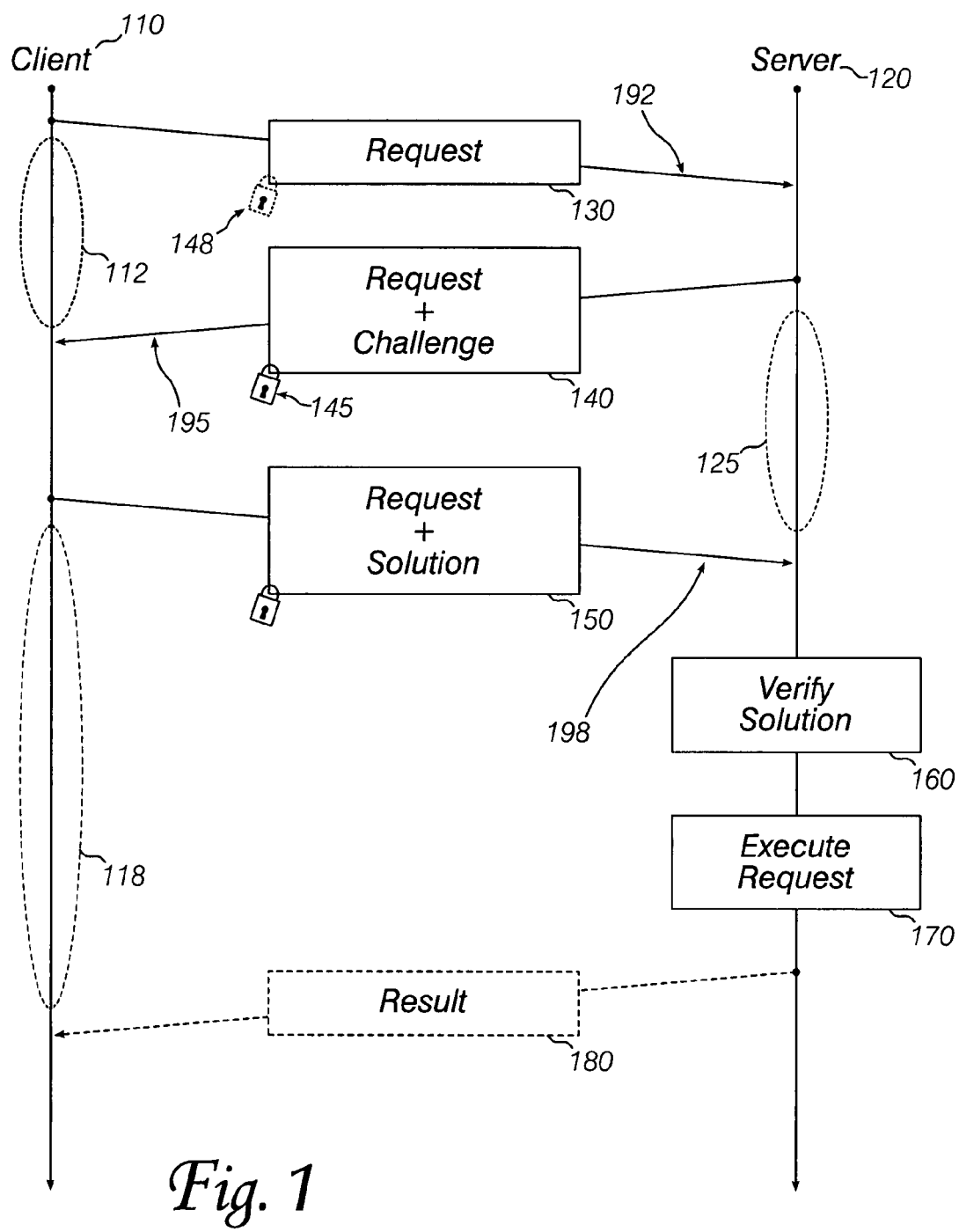
FIG. 1 outlines messages transmitted between parties interacting according to an embodiment of the invention.

FIG. 1 outlines messages exchanged between two parties interacting according to an embodiment of the invention. For convenience, the parties are referred to as client 110 and server 120; the inventive protocol may be used when client 110 wishes to cause server 120 to take some action. First, client 110 transmits a request 130 to server 120. The request may or may not call for an eventual result message from the server.

Upon receiving the request, the server prepares a challenge 140 containing the request and a puzzle that can only be solved by a client for which the server is willing to execute the request. The entire challenge is embedded in a tamper-resistant structure (indicated in this figure by lock 145) so that the server 120 can detect any modifications to the request or attempts by the client 110 to circumvent the puzzle.

The tamper-resistant structure may be created by calculating a message authentication code ("MAC") over the structure, including at least the request and the puzzle. The MAC may be calculated using a secret key known only to the server, so only the server can verify the MAC. The puzzle may be an encrypted nonce (a pseudo-random number chosen in a way unpredictable to an attacker, or a true random number, preferably used only once) that an acceptable client can decrypt with a secret key it shares with the server, or the private half of a public-private keypair. The tamper-resistant feature (e.g. the MAC) may be combined with the puzzle. For example, the puzzle could be the MAC itself or a function of the MAC and a nonce, encrypted so that only an acceptable client can decrypt it. By solving the puzzle, the client might produce a MAC that the server could verify directly (the client, however, might not be able to verify it).

The client 110 receives the tamper-resistant challenge and may check to ensure that the request correctly describes what it wants server 120 to do. (The client may have made its initial request tamper-resistant also, as indicated by optional "dashed line" lock 148. A tamper-resistant request might include a MAC calculated based on a secret known only to the client. The client can validate such a MAC to ensure that the server, or an attacker intercepting the messages, did not change the request or submit a spurious request with a forged return address, even if the client has kept no state information about the request after sending the request 130.)

The client solves the puzzle and returns a response 150 containing the request and the solution. The server confirms that the solution is valid (160) and that the request has not been modified, and then executes the request (170). Finally, if the request calls for a reply, the reply 180 (e.g., containing the result of executing the request) is prepared and transmitted to the client.

The protocol outlined with reference to FIG. 1 has several useful characteristics. First, it is truly stateless—neither the client nor the server need devote resources to remembering anything about its peer in the conversation during the time periods indicated at 112, 125 and 118. Any state information relating to the interaction accumulates in the messages that the parties exchange. Messages may be transmitted between client and server by a connectionless protocol such as the User Datagram Protocol ("UDP"). Thus, not even low-level system resources are consumed, as they would be, for example, if a connection-oriented protocol such as the Transmission Control Protocol ("TCP") was used. The use of UDP may also relieve resource pressure on network-infrastructure devices such as routers, switches, bridges and firewalls between the client and server. A TCP connection might require that these intermediate devices also store information to support client-server communication, but UDP packets are less likely to require such support. In another embodiment, several separate, short-lived TCP connections may be used instead of UDP packets. These TCP connections would involve the maintenance of some state information while they were active, but could otherwise be completely independent—the client could send its request one day, the server could send the challenge over a new connection the next day, and the client could provide the solution to the puzzle via a third connection the following day, even with intervening machine resets or reboots, and the protocol would complete successfully. Other network protocols, offering different combinations of reliability, security, and other inherent features, can also carry the messages of an embodiment of the invention between client and server. The Reliable User Datagram Protocol ("RUDP"), Reliable Datagram Protocol ("RDP"), Internetwork Packet Exchange ("IPX") protocol, and PARC Universal Protocol ("PUP") are all serviceable alternatives.

Several attack points are illustrated in FIG. 1; in addition, some general attacks will be discussed here. First, an attacker, which is assumed to have full access to and control of the communication channels, can record and replay messages, block messages, and substitute its own messages at will. Blocked messages will, of course, prevent the protocol from proceeding, but cannot cause the server to execute an attacker's chosen request. If the attacker intercepts request 130 at point 192 and substitutes its own request, server 120 will not notice, but client 110 may detect the substitution when server 120 returns the request/challenge message 140 (assuming that client 110 made its request 130 tamper-resistant, as discussed above). Even if request 130 is not tamper-resistant, client 110 may detect the substituted request if it is not a request the client would normally make. If the attacker switches out the client's true request at 192, but replaces the true request at 193, the client may not detect the attack, but the server will be able to determine that the client solved the challenge for a different request if the tamper-resistant challenge embeds information about the request.

An attacker can frustrate the protocol by blocking or tampering with the request/challenge message 140 at point 195, but it cannot modify the tamper-resistant request or insert a substitute challenge without detection, either by the client 110 or in the subsequent phase by the server 120. Similarly, message 150 can be blocked or damaged at point 198, but server 120 can detect and refuse an attempt to substitute an attacker's request for the client's request in message 150. Finally, if server 120 embeds a timestamp or serial number in the request/challenge message 140, the protocol is resistant to replay attacks where the attacker submits copies of the request/solution message 140 in hopes of causing the server to execute the request again and again.

Figure 2:
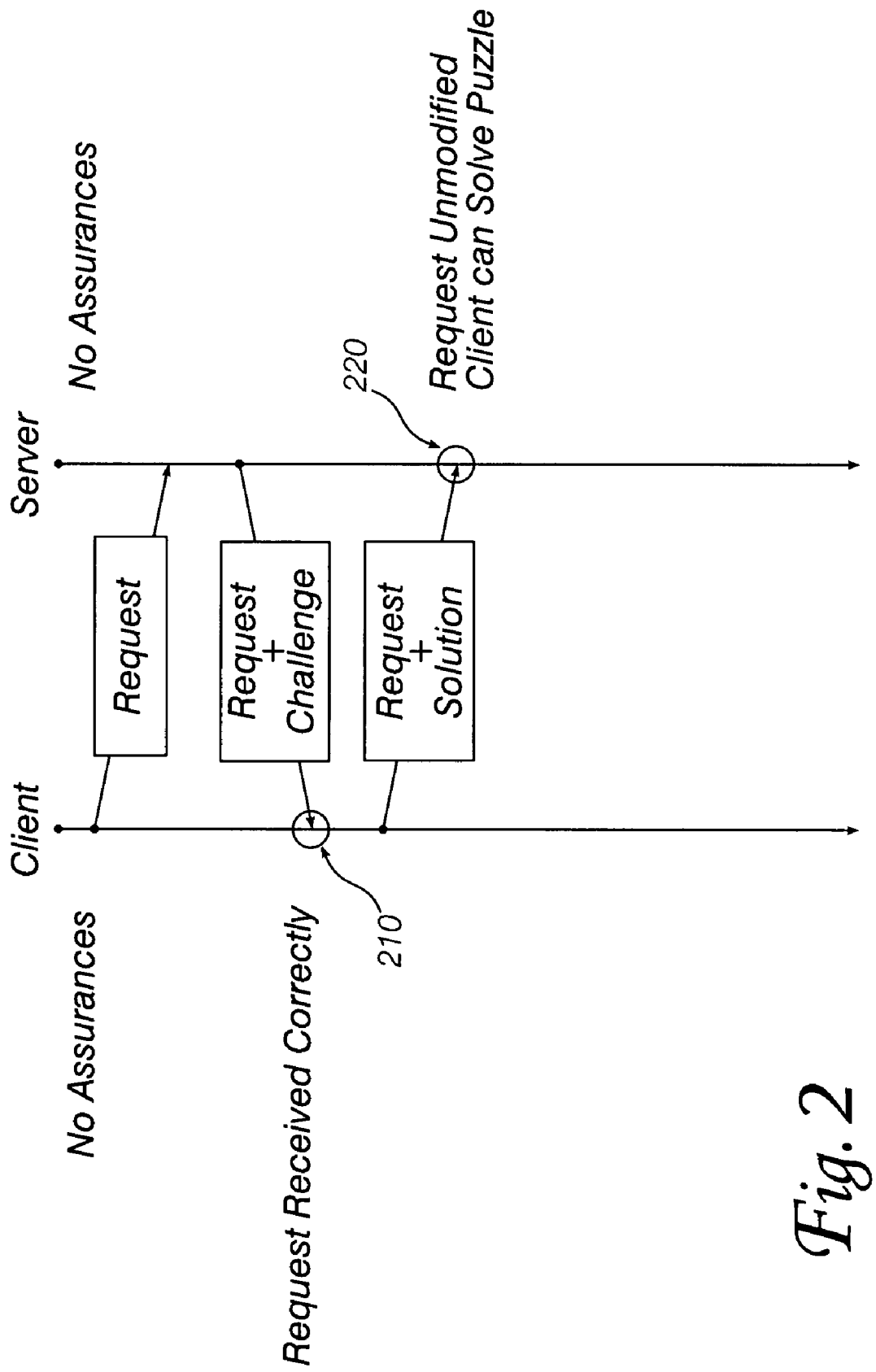
FIG. 2 shows how a client and server learn about each other as they participate in the stateless challenge-response protocol.

A second useful characteristic is that the protocol provides data integrity, peer identification, and attack resistance in measures well-suited for a network-management application described below. FIG. 2 shows how the protocol gives increasingly strong assurances to the participants as their interaction continues. Before the first (request) message, neither party has any specific information about the other. However, in many environments, the parties will share a common secret; proving possession of the secret will occur later in the protocol. The request message does not change this situation: it gives no further assurances to either party (specifically, the client cannot be sure that the server received the request correctly, and the server cannot be sure that the request is from an acceptable client, as opposed to an impostor).

The tamper-resistant challenge sent from the server to the client provides an assurance 210 to the client that the server received the request correctly. This is because the tamper-resistant challenge contains a copy of the request. If the client used "fire and forget" to send the request, it may not have stored a copy of the request. Therefore, in some embodiments, the original request will be in a tamper-resistant structure, so that the client can verify that it must have made the request, though it has no present memory of doing so. A tamper-resistant request may include a message authentication code ("MAC") or a cryptographic signature that can be validated by using a secret key known only to the client. This optional validation can help thwart a denial-of-service attack where a stream of forged requests are sent to the server, which responds by sending tamper-resistant challenges to the client. The client can drop any challenges that correspond to requests it did not send.

The client responds to the tamper-resistant challenge by solving the puzzle contained therein and sending the solution to the server, assuring the server 220 that the request has not been modified and that the client is capable of solving the puzzle. Puzzles are discussed in greater detail below, but generally comprise an encrypted item that the client can decrypt with a key it possesses. The client's response to the tamper-resistant challenge provides two assurances to the server: first, that the client did not modify the request; and second, that the client was able to solve the puzzle. Embodiments of the invention are commonly deployed in environments where ability to solve a puzzle corresponds acceptably with identity. That is, the server is willing to extend trust to a communication partner that can solve the puzzle, by executing the request made by the partner.

After executing the request, the server may have a result to report to the client. This result may include a secure identifier to permit the client to confirm that the result corresponds to a request that the client made earlier. The secure identifier thwarts an attack where, for example, the client wishes to monitor the continued functionality of the server: an attacker cannot simply spoof or replay "Alive" or "OK" messages from the server after incapacitating the server, because the spoofed messages would not have valid secure identifiers.

Figure 3:
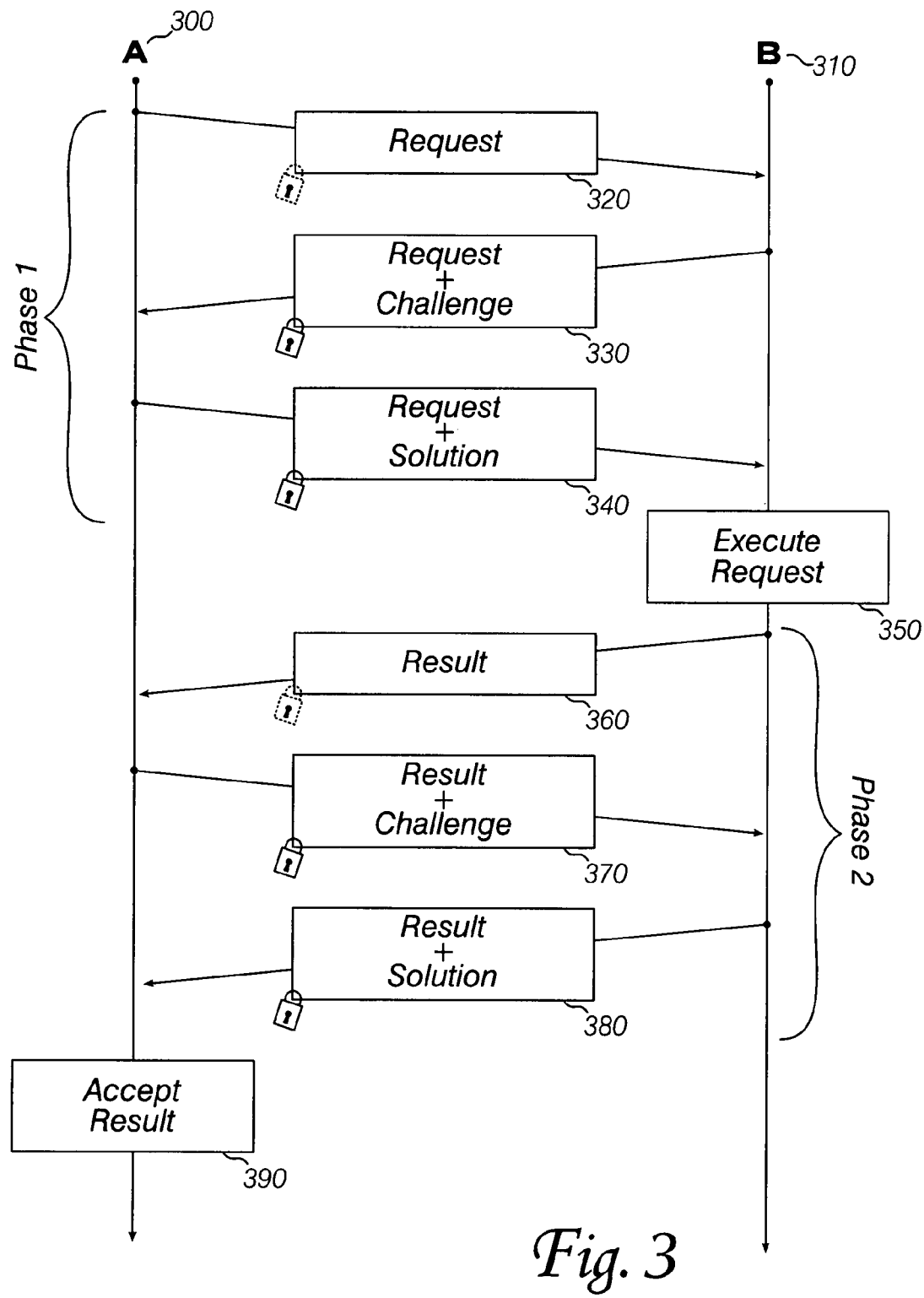
FIG. 3 shows how two parties can use the inventive protocol in both directions to extend the stateless interaction.

An alternative for providing a result from the server to the client is to start a second stateless challenge-response protocol, with the server and client switching roles. FIG. 3 shows how this could work. Since the participants in the protocols switch roles midway through, they will be called participant A (300) and participant B (310) to avoid confusion. To begin, A sends a request (320, optionally tamper-resistant) to B. B responds with a tamper-resistant request and puzzle (330). A verifies the request, solves the puzzle, and returns the request and solution (340). B verifies the solution and executes the request (350).

Now, B has a result to send to A. According to this embodiment, B sends the result (360, optionally tamper-hardened) to A. A responds with a tamper-resistant message containing the result and a puzzle (370). B verifies the result, solves the puzzle, and sends the result and solution (380). A verifies the solution and accepts the result (390).

The second half of this stateless challenge-response protocol can be thought of as a "request" by B that A accept the result. (In fact, the result may cause A to perform some action desired by B.) A can use the protocol to obtain assurance that the result is really from B (and not, for example, from an impostor or an attacker replaying an earlier result message). A and B can interact further by reversing the protocol again.

Puzzles

For the purposes of embodiments of the invention, a puzzle is a computational task that is simple to perform with knowledge of a secret, and infeasible without such knowledge. Puzzles usually have a cryptographic or number-theoretic basis. For example, one puzzle may be an encrypted string, which can be decrypted only with the appropriate key. Another puzzle may be a large integer, that can only be factored quickly if the solver knows a (secret) prime factor. In an embodiment of the invention, the server sends a tamper-resistant challenge containing a puzzle to the client. If the client can solve the puzzle (and prove this ability by sending the solution in a response to the challenge), the server is assured that the client knows the secret.

A server may produce puzzles by encrypting a string or bit sequence known only to the server, with a key known to the client. To avoid succumbing to replay attacks, where the attacker eavesdrops to obtain the client's solution and then attempts to present the same solution with other requests, the server may embed a time of day, a sequence (serial) number, or a digest ("hash," message authentication code or "MAC") of the request in the encrypted string. The solution to such a puzzle can only be used with the request to which it corresponds.

Note that a party to this protocol should not encrypt or decrypt any arbitrary string that is presented—doing so may provide an avenue for an attacker to obtain information about the secret key. Thus, when the client solves the puzzle, it may return the solution re-encrypted or convolved with a number of the client's own choosing. This technique allows the client to prove that it was able to solve the puzzle, without disclosing to an eavesdropper exactly what the solution was.

Tamper Resistance

One of the advantages of protocols according to embodiments of the invention is that they are stateless: neither party needs to retain any information about the other party to complete the protocol. One key to achieving statelessness is making protocol messages tamper-resistant. A message is tamper-resistant if the reply to the message permits the sender to verify that the other party received the message correctly, and did not modify it in the reply. This quality may also be described as "tamper evident:" any modification of the message can be detected reliably. One may think of the messages exchanged according to an embodiment of the invention as carrying the state back and forth between the parties so that neither party need store the information locally. Tamper resistance prevents one party from changing the state without the knowledge of the other party.

Some embodiments of the invention may embed a cryptographic hash of critical state information in the message. For example, the client may append a hash of its request to the request, so that it can tell if the server changes the request in producing the tamper-resistant challenge. (An ordinary hash is inadequate for this purpose: if there is no secret component to the hash, an attacker could simply change the message and re-compute the hash. A tamper-resistant message must involve or incorporate some secret information so that an attacker cannot change the message undetectably.) Similarly, the tamper-resistant challenge permits the server to tell if the client attempts to change its request when it provides the solution to the challenge. Tamper-resistance can stop a man-in-the-middle ("MITM") attack: the MITM can intercept messages in both directions and replace them with its own messages, but it cannot trick the server into executing a command different from the client's actual command, nor trick the client into solving a puzzle corresponding to a malicious command that the attacker would like to present to the server.

In some embodiments of the invention, a client and server may use shared or complementary secrets to encrypt the messages they exchange. Such encryption may provide secrecy from an eavesdropper, in addition to the resistance against MITM attacks of a plaintext embodiment.

It is appreciated that a server or client operating according to an embodiment of the invention must maintain some data. For example, a server may keep its own secret keys and/or serial numbers; and the server and client may share a secret key or a public/private key-pair. However, this data may be used for many or all instances of protocol interaction—neither party needs to remember the details of any particular transaction as the transaction is progressing. These details are safely and securely contained in the messages that pass back and forth according to an embodiment of the invention. Furthermore, there is no implicit state necessarily associated with a particular transaction, as there would be if, for example, the transaction occurred over a single connection-oriented protocol such as the Transmission Control Protocol ("TCP"). A TCP connection requires the communicating systems to keep track of window sizes, sent, received and acknowledged byte counts, and other similar information; even if the application programs do not keep any state, the system keeps some state on their behalf. (The protocol could, of course, be performed over a TCP connection, or over several independent TCP connections, as well as over a UDP connection. However, such a usage does not capitalize on a benefit that the invention offers.)

Figure 4:
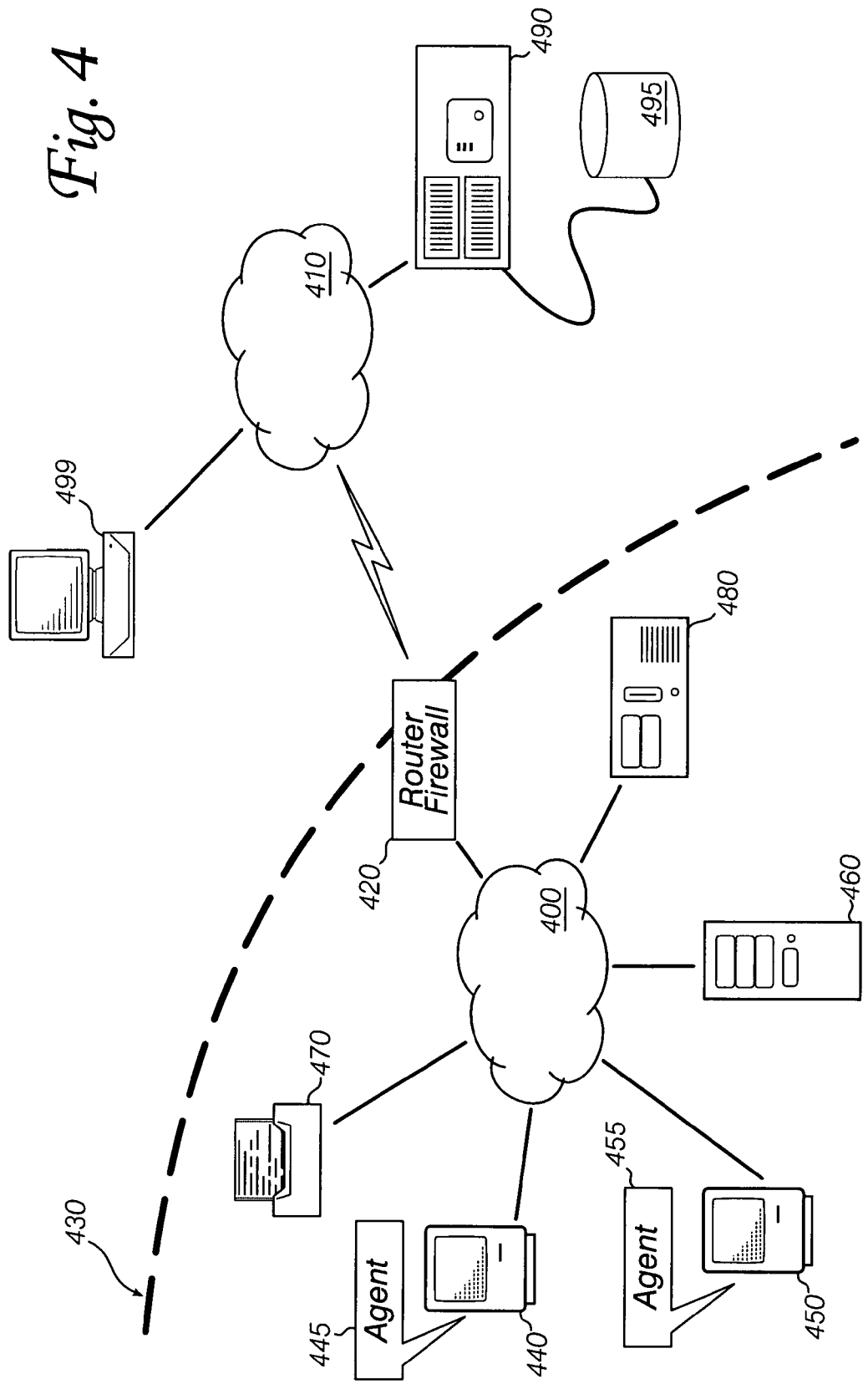
FIG. 4 shows a sample environment where an embodiment of the invention may be used.

FIG. 4 shows an environment where an embodiment of the invention is used in a practical application. A data communication network 400 such as a local area network ("LAN") is kept separate from a public distributed data network 410 such as the Internet by a router/firewall device 420. Router/firewall 420 establishes a boundary 430 between private network 400 (which may be, for example, a corporate LAN) and the public Internet 410. Devices within boundary 430 may be permitted to access some resources outside the boundary, but firewall 420 may restrict or prohibit inbound connections. Within the private network, devices such as personal computers 440 and 450, server 460 and printer 470 interact freely to accomplish the work of the organization or entity that operates network 400.

Outside boundary 430, a server 490 offers a network monitoring and management service in a "software as service" mode. Network monitoring is important to ensure reliable operation, but complex software and configuration requirements may place an enterprise-class network operations center ("NOC") out of reach for some clients, and may impose a significant burden on the resources of others. By consolidating knowledge and network management skills at a NOC that serves many different clients, each client may obtain better control over its network while reducing its administration costs.

One difficulty that arises in this configuration is providing access from network management server 490 to the various devices in the private managed network behind router/firewall 420. Configuring and managing firewall settings to grant access to and from each device may cancel out the management savings of offloading network management tasks. However, if a network monitoring appliance system 480 is deployed within the private boundary, this system can serve as a data collection and control point for management server 490. Firewall 420 need only be configured to allow one device—monitoring appliance 480—to communicate with management server 490.

Figure 5:
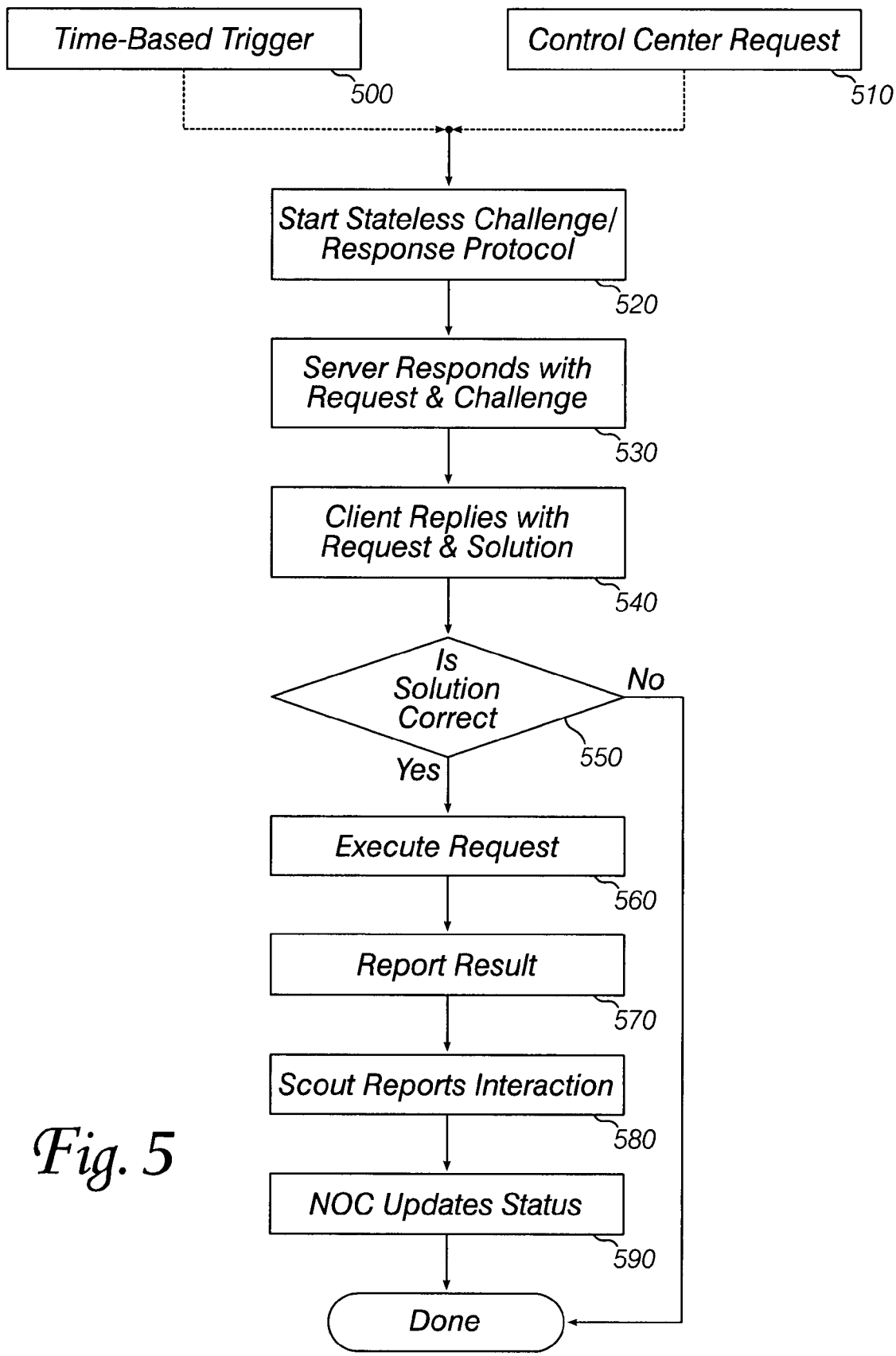
FIG. 5 is a flow chart showing operations according to an embodiment.

An embodiment of the invention is used at monitoring appliance system 480 to provide the security and resource-saving advantages discussed above. FIG. 5 outlines a sample interaction between monitoring appliance 480 and a software agent 445 at a managed personal computer 440. FIG. 4 also shows a management console 499 which can access management server 490 to view current information about the network behind boundary 430, or historical information stored in a database 495; and can direct management server to make changes to managed systems (with the assistance of monitoring appliance 480). Although management console 499 is shown outside the private network boundary in this Figure, another computer within the boundary could also contact the management server to monitor and control the private network. Management server 490 would, of course, implement security and authentication measures to ensure that a user at management console 499 is authorized to view and/or control the private network.

FIG. 5 outlines an interaction between monitoring appliance 480 and a software agent 445 at personal computer 440. Through this interaction, monitoring appliance 480 can obtain information about computer 440, and can report that information to management server 490 for incorporation in the "world view" of the network maintained there.

Operating on a time-based schedule (500) or upon receiving a request from the network operations center (510), the monitoring appliance initiates a stateless challenge-response protocol interaction with a management target (520). In this interaction, the monitoring appliance acts as the client, transmitting a request to the target (which acts as a server). This assignment of "client" and "server" labels is different from the more common case: a personal computer usually acts as a client in obtaining a service or resource from a server. The management target may include a software agent, as shown in FIG. 3, that permits it to act as a server in the interaction under consideration.

The management target responds with a message containing a tamper-resistant request and challenge (530), to which the monitoring appliance replies with the request and a solution to the challenge (540). The target verifies the solution (550) and executes the request (560). If executing the request generated information that the monitoring appliance sought, this information may be sent to the monitoring appliance (570). For example, the monitoring appliance may use this interaction to determine how busy the personal computer is (its "load average" or processor utilization), its memory or network utilization, amount of free disk space, uptime, or similar information. Alternatively, the monitoring appliance may send a command to cause the personal computer to shut down or restart. The monitoring appliance may report its interaction with the target to the management server (580), and the latter may update its databases to reflect newly-learned information about the target (590).

The monitoring appliance may also include logic for interacting with managed devices according to other protocols, such as the Simple Network Management Protocol ("SNMP") for generic device monitoring and control or application-specific protocols for monitoring databases and server applications. These protocols may have similar purposes (e.g., obtaining status information from a device, or directing the device to change its behavior) but lack the favorable combination of identity and security assurances and statelessness available to entities communicating according to the inventive protocol.

Some implementations of the stateless challenge-response protocol may borrow syntax from other protocols. For example, although the Hypertext Transport Protocol ("HTTP") is not a stateless protocol as described here, the HTTP request format described in Internet Engineering Task Force ("IETF") Request for Comments ("RFC") document number 2616 ("RFC2616"), published June, 1999, is simple and flexible, and code to produce and interpret HTTP requests is readily available. Therefore, an embodiment may send a message like this:
GET /?object=process&name=iexplore.exe
which resembles an ordinary HTTP request. The server might respond with an Extensible Markup Language ("XM") document containing the tamper-resistant request and challenge:
counter=15;timestamp=1191353017;
request=GET%20%2F%3Fobject%Dproc
ess%26name%3Diexplore.exe;mac=[elided to save space]
This response contains features such as a serial number (counter), a timestamp, and a message authentication code ("MAC") to provide tamper resistance. The challenge may be expressed as another clause of the XML document, or the client may prove its identity by performing an operation on the counter, timestamp, MAC, or another portion of the response.

Thus, the request, challenge, response and other messages may resemble messages formatted according to existing protocols, but the resemblance is mostly superficial, and the formatting is chosen chiefly to promote code re-use. The request, challenge and response messages need only have the particular features as claimed below, and provide the claimed assurances.

Figure 6:
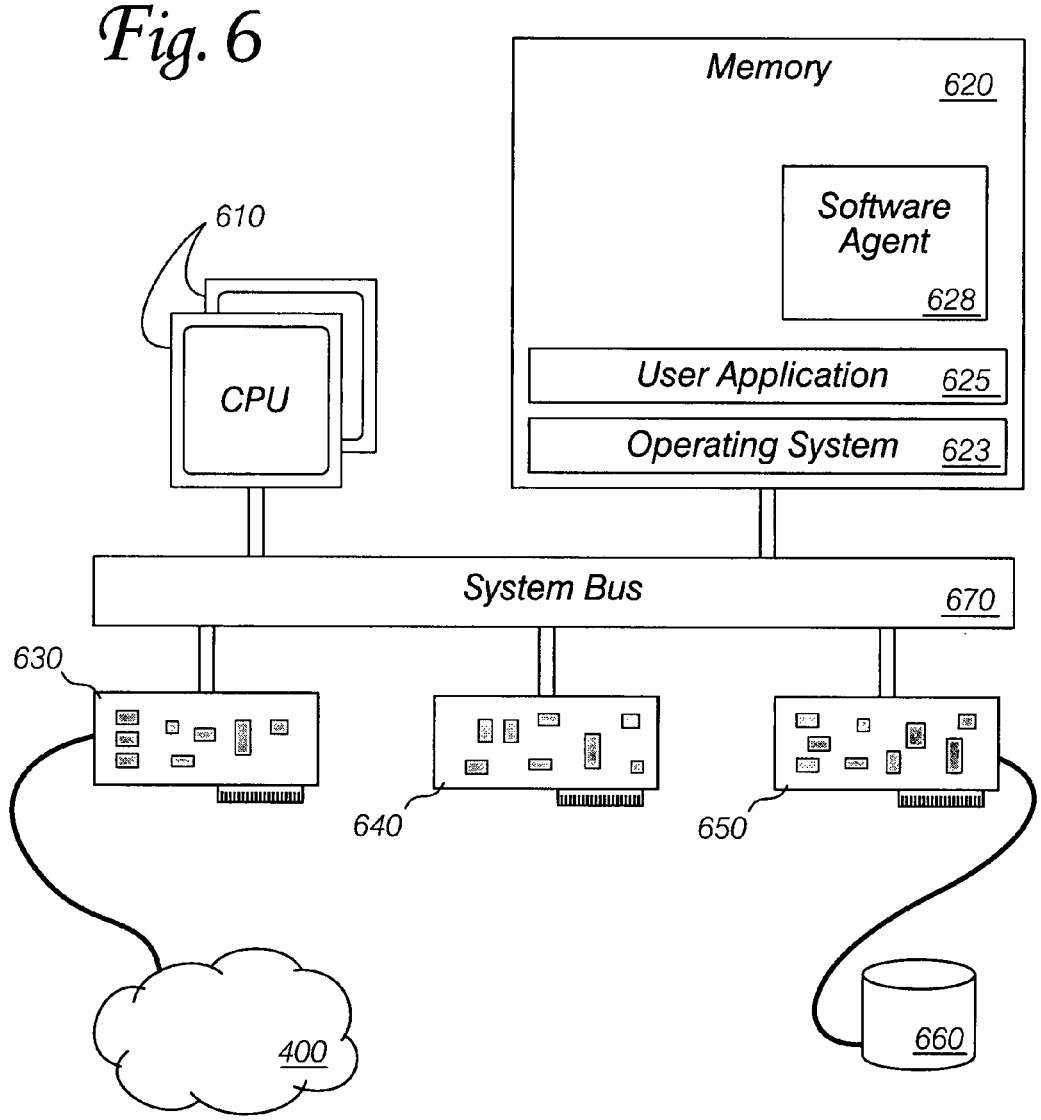
FIG. 6 shows some components and subsystems of a computer system that includes an embodiment of the invention.

One embodiment of the invention is a software agent (i.e., instructions and data to control the programmable processor of a general-purpose computer) configured to operate in a system like that shown in FIG. 6. One or more programmable processors ("central processing units" or "CPUs") 610 execute instructions contained in memory 620 to perform the methods described above. Memory 620 may include instructions and data of an operating system ("OS") 623, user applications 625, and a software agent 628 to act as a server capable of participating in a stateless challenge-response protocol and executing a scout's requests if the scout can respond satisfactorily to a challenge. The system may include a network interface 630 for communicating with peers via a distributed data network 400; other hardware devices (e.g., interface card 640); and a mass storage interface 650 with its corresponding mass storage device (e.g., hard disk) 660. These components are connected to, and exchange data and control signals via, a system bus 670.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), erasable, programmable read-only memories ("EPROMs"), electrically-erasable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that participation in a stateless challenge-response protocol can also be achieved by software and hardware that distribute the functions of embodiments of this invention differently than herein described. Such variations and implementations are understood to be captured according to the following claims.

I claim:

1. A method comprising:
    receiving, by a server, a request from a client coupled to the server via a network;
    transmitting, by the server, a tamper-evident challenge including the request to the client;
    receiving, by the server, a response to the tamper-evident challenge from the client, the response including the request;
    verifying, by the server, the response; and
    if the request has not been modified, performing the request by the server.

2. The method of claim 1 wherein the receiving and transmitting operations comprise transactions according to a connectionless protocol.

3. The method of claim 2 wherein the connectionless protocol is a User Datagram Protocol ("UDP").

4. The method of claim 1 wherein the tamper-evident challenge includes a time value, a sequential counter and a message authentication code ("MAC").

5. The method of claim 1 wherein the tamper-evident challenge includes data encrypted by a key shared with the client.

6. The method of claim 5 wherein verifying the response comprises confirming that the client has the key.

7. The method of claim 1, further comprising:
    discarding the request after transmitting the tamper-evident challenge and before receiving the response to the tamper-evident challenge.

8. A method for implementing a two-party protocol comprising:
    a first party sending a request to a second party, the request lacking assurances to either party;
    the second party sending a tamper-resistant challenge including a copy of the request to the first party, the tamper-resistant challenge providing assurance to the first party that the second party received the request correctly;
    the first party sending a response to the tamper-resistant challenge, the response containing the request and providing assurance to the second party that the first party shares a secret with the second party and that the first party did not modify the request; and
    the second party performing the request.

9. The method of claim 8, further comprising:
the second party discarding all records of the request after sending the tamper-resistant challenge to the first party.

10. The method of claim 8 wherein the tamper-resistant challenge contains at least one of a time, a sequence number, or a Message Authentication Code ("MAC").

11. The method of claim 8 wherein the tamper-resistant challenge contains a puzzle for the first party.

12. The method of claim 11 wherein the response to the tamper-resistant challenge contains a solution to the puzzle.

13. The method of claim 11 wherein the puzzle comprises a ciphertext of plaintext data selected by the second party and data sent by the first party.

14. The method of claim 13 wherein the response to the tamper-resistant challenge contains a ciphertext of the plaintext data selected by the second party and plaintext data selected by the first party.

15. A non-transitory machine-readable storage medium containing data and instructions to cause a programmable processor to perform operations comprising:
preparing, by a server computer system, a challenge containing a request from a client and a puzzle that can be solved by an entity holding a secret key, the challenge to be encapsulated in a tamper-evident container;
discarding the request from the client after preparing the challenge;
transmitting the challenge to the client;
verifying a response to the challenge, the response containing the request and a solution to the puzzle; and
performing the request.

16. The machine-readable storage medium of claim 15, containing additional data and instructions to cause the programmable processor to perform operations comprising:
reporting a measurement of a system statistic to the client.

17. The machine-readable storage medium of claim 16 wherein the system statistic is one of a processor utilization, a memory utilization, a network utilization, a disk utilization or a system uptime.

18. The machine-readable storage medium of claim 15, containing additional data and instructions to cause the programmable processor to perform operations comprising:
changing a state of a system service.

19. The machine-readable storage medium of claim 15, containing additional data and instructions to cause the programmable processor to perform operations comprising:
rebooting the system.

20. A server computing system comprising:
a memory; and
a processor, coupled to the memory, to:
receive a request from a client coupled to the server computing system via a network;
transmit a tamper-evident challenge including the request to the client;
receive a response to the tamper-evident challenge from the client, the response including the request;
verify the response; and
if the request has not been modified, perform the request.

21. The system of claim 20 wherein the tamper-evident challenge includes a time value, a sequential counter and a message authentication code ("MAC").

22. The system of claim 20 wherein the tamper-evident challenge includes data encrypted by a key shared with the client.

23. The system of claim 20, wherein the processor is further to:
discard the request after transmitting the tamper-evident challenge and before receiving the response to the tamper-evident challenge.

* * * * *